Feb. 5, 1946.   J. MARTIN   2,394,425
QUICK-RELEASE HOOD FOR AIRPLANE CABINS
Filed March 9, 1942   2 Sheets-Sheet 1

Inventor
JAMES MARTIN.
per Rayner &c
Attorneys

Feb. 5, 1946. J. MARTIN 2,394,425
QUICK-RELEASE HOOD FOR AIRPLANE CABINS
Filed March 9, 1942 2 Sheets-Sheet 2
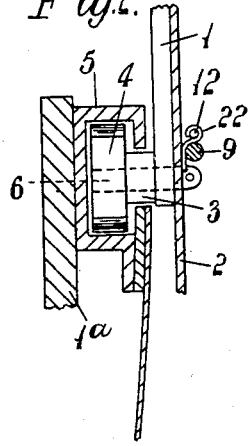
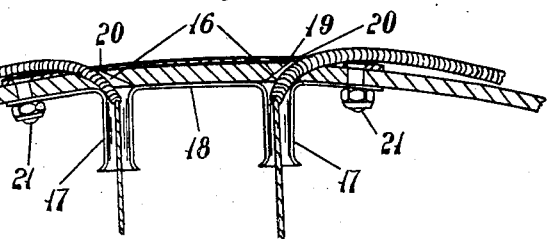
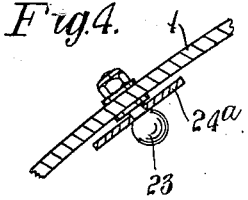
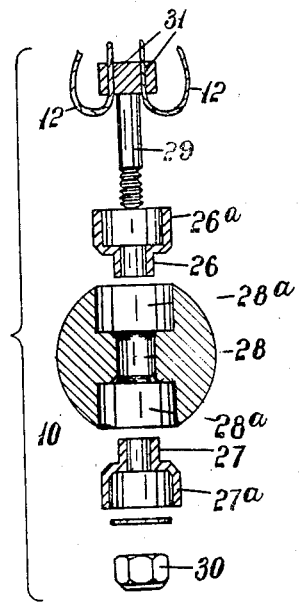
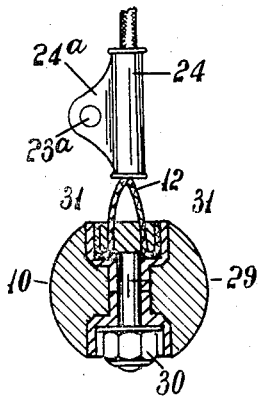
Inventor
JAMES MARTIN
per Rayner Ho
Attorneys Patented Feb. 5, 1946

2,394,425

UNITED STATES PATENT OFFICE 2,394,425

QUICK-RELEASE HOOD FOR AIRPLANE CABINS

James Martin, Higher Denham, near Uxbridge, England

Application March 9, 1942, Serial No. 434,015
In Great Britain March 20, 1941

5 Claims. (Cl. 244—121)

This invention relates to the hoods or tops of cabins or cockpits of airplanes and more particularly to means whereby the hood or top may be readily jettisoned in the event of the pilot or passenger wanting to make an emergency parachute descent, or wanting to escape from a crashed or burning airplane. The chief object of this invention is to provide a highly positive quick-release device which by a simple momentary operation will free the hood or top for jettisoning to afford an unobstructed exit, and yet normally affords a positive and rigid anchorage of the hood or top to the fuselage without imposing flying strains on the releasing device which might impair its efficiency and prevent the ready response in operation which is essential when making a hurried escape from an airplane. Another object of this invention is to provide a quick-release device which can be readily adapted to existing aircraft fitted with hoods constructed and arranged to be moved relatively to the fuselage to vary the effective area of opening above the cabin or cockpit, whereby with very slight and easily applied additions the hood is rendered capable of being entirely freed from parts which normally connect it adjustably to the fuselage. Further to these objects the present invention contemplates the application to a known form of airplane cabin hood of the sliding type of an emergency quick release device which will enable the hood to be freed, by the momentary operation of a single member, from the members which normally are fixed to the hood to form runners for the hood.

In carrying one form of this invention into practice a cabin hood of the transparent or partly transparent type with a metal frame is slidably supported by means of a number of runners, such as bearing blocks, engaged in two longitudinal guides on the fuselage body in known manner. However instead of securing the runners and the hood together in an inseparable manner they are held together by means of inter-engaging elements and locking means which normally connect them to each other in a positive manner so that the hood and its runners may slide freely in its guides. The locking means which hold the parts in engagement are adapted to be released by movable release members coupled to a single control handle which may be carried by the hood in a readily accessible position. A sharp pull on the handle will release the locking means so that the hood is free for immediate detachment from its runners and will escape leaving a free and unobstructed exit for the occupant or occupants of the airplane. The invention is particularly advantageous when applied to single seater aircraft of the "fighter" type and provides an instantaneous and dependable means for jettisoning the hood of the machine to afford a free and unobstructed opening through which the occupant may escape and which is independent of the usual guides in which the hood is mounted for slidable adjustment for normal use, and does not involve springs and complicated locking devices requiring constant supervision and liable to get out of order.

In order that this invention may be clearly understood and readily carried into effect, drawings are appended hereto illustrating an embodiment thereof as applied to a hood of the cabin of a fighter type of airplane, and wherein:

Fig. 2 is a detail sectional end elevation showing one of the runners or bearing blocks in the guide channel of the fuselage, and also showing the means for detachably connecting the hood to the runners or bearing blocks.

Fig. 3 is a detail sectional front elevation showing the lead-in fittings for guiding the cables of a pair of Bowden wires to a common operating member, which forms a remote control releasing device for both sides of the hood.

Fig. 4 is a detail view of a stowing clip for normally retaining the said operating member in a non-obstructive position.

Fig. 5 is an exploded view of the elements of the handle of the said operating member, and Fig. 6 is a sectional elevation with the said elements assembled and showing how the said cables are securely locked to the handle.

Figure 1:
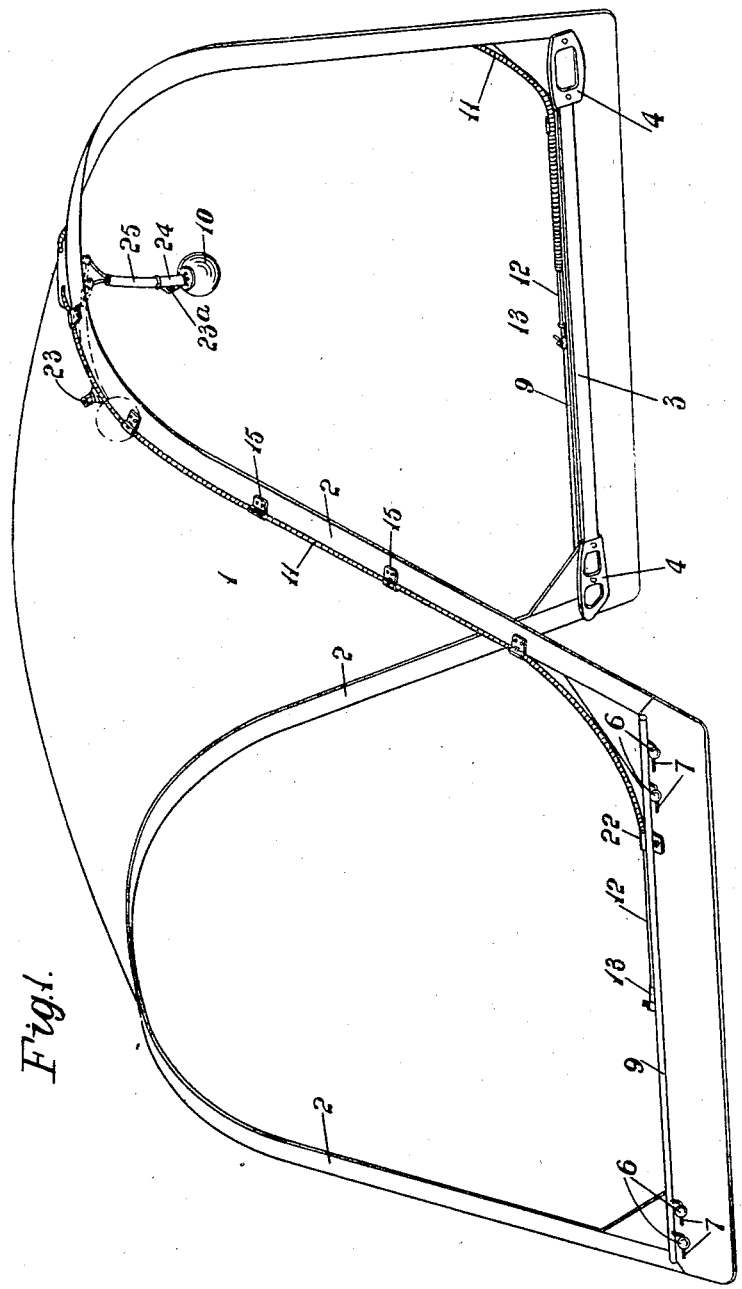
Fig. 1 is a perspective view showing the hood with the quick-release locking device in its normal or fastening position.

Referring to the drawings the hood shown is of known form and comprises a moulded transparent sheet 1 of cellulose acetate or like material mounted at its perimeter in a thin metal frame 2 the longitudinal lower parts of which are stiffened by a pair of longitudinal bars 3 which also serve as distance pieces between the hood and two pairs of runners or bearing blocks 4 which slide in two longitudinal guide rails 5 fixed to the fuselage 1a close to the opening of the cabin or cockpit so that the hood spans and covers such opening and can be slid endwise to the opened and closed positions.

The stiffening bars 3 afford sufficient thickness of metal to locate a pair of uni-lateral retaining pins 6 of each bearing block 4 firmly in position relatively to the hood, but instead of permanently fixedly locating these retaining pins in the hood frame they fit easily in the bars 3 and frame 2 and project only a slight distance beyond the exterior of the hood frame whereby the hood can be easily freed from the retaining pins when it is required to jettison the hood, whilst the retaining pins are sufficiently thick and firm to afford safe anchorage for the hood. Normally, the hood is secured against escape from the four pairs of retaining pins 6 by means which affords part of a single action quick-release device operable momentarily by the pilot or passenger, and does not receive directly the strains set up by the forces acting on the hood during flight.

The said quick-release device can incorporate any suitable form of easily disconnected or easily disengaged locking member with each retaining pin 6, and also any suitable arrangement of operating device common to all of the locking members, so that such members will be actuated simultaneously with a snap or momentary action. A convenient arrangement is the use of four pairs of narrow steel wires 7 each of cranked or L configuration and each having a longitudinal limb slid through a transverse aperture 8 in each retaining pin near the free end of the retaining pin, such free ends of the retaining pins being rounded as shown to allow for ease of movement through the hood frame. The locking wires 7 are affixed by their vertical limbs to a longitudinal pair of release bars 9, such bars extending along and parallel with the lower horizontal sides of the hood frame 2. It is preferred to pass the vertical limbs of these locking wires diametrically through the bars 9 and to weld their upper ends into inwardly pinched depressions in the pair of bars, the bars being circular section tubes of light gauge metal. These release bars 9 are pulled forwardly of the hood to free the locking wires 7 from the retaining pins 6, and for this purpose both bars are supported by their cranked locking wires and are connected to a common actuating handle in the form of a ball 10 supported at the top of the front of the hood, the connection to this ball handle being by means of a pair of Bowden wires 11.

The cables 12 of the Bowden wires are connected to the release bars 9 by a pair of ferrules 13 fixed to the median parts of the two longitudinal release bars, and the sheaths 14 of these two cables are secured by clips 15 to the hood frame so as to lie close against the base and front parts of the hood frame, the ends of the cables and their sheaths remote from the releases bars being passed through a pair of inclined apertures 16 in the hood top as shown in Fig. 3, and the two cables are carried beyond these inclined apertures and firmly secured to the ball handle 10, so that a sharp pull on this ball handle 10 will retract both of the release bars 9 and disengage the cranked wires 7 from their pins.

The upper ends of the two Bowden wires are guided through a depending pair of tubular guides 17 formed integral with a plate 18 comprising an inner lead-in fitting, another plate 19 being fitted flush against the exterior of the hood top to form an outer lead-in fitting and being apertured as at 20 to register with the outer ends of the inclined apertures 16. Bolts 21 are passed through the transparent hood and the outer and inner plates of this lead-in fitting to clamp the two plates in position, the edges of the apertures 20 pressing against the two sheaths to bind them in position. The lower ends of the two sheaths are secured to the hood frame by clips 22 fixed to the frame.

The ball handle 10 does not normally depend freely from the lead-in fitting but is stowed close to the hood top as shown in broken lines, for which purpose a stowage clip in the form of a ball headed bolt 23 is fixed to the hood top, the ball head receiving a lug 24a integral with a rubber collar 24 which may form part of the beforesaid handle 10, this lug being apertured as at 23a to stretch over the ball head of the clip. A rubber tube 25 together with the collar 24 receives the appropriate ends of the two cables of the Bowden wire, and the rubber ball 10 comprises the free terminal of the handle to afford a convenient "pull" for the operator.

It is essential to ensure that the two cables of the Bowden wire are securely held in the handle, and also that any slackness in the cable can be taken up, and for this purpose the ball 10 is provided with a fastening device (see Figs. 5 and 6) which will tightly grip the cable ends. This fastening device comprises a co-axial pair of symmetrical metal bushes 26 and 27 fitted in a central hole 28 in the ball 10 and each formed with an enlarged cupped head 26a and 27a respectively both seating in correspondingly dimensioned upper and lower enlargements 28a of the hole 28. In the upper of these cupped heads is engaged the head of a bolt 29, and in the other a nut 30 threaded on to the bolt. The bolt head is formed with a pair of holes 31 parallel with the axis of the bolt, and before the bolt is fitted in the ball 10 the cable ends are threaded through these holes and turned back against the perimeter of the bolt head, so that when the bolt is inserted in the ball 10 the extremities of the cables lie between the bolt head and the interior of the cup of the upper bush 26, the application of the nut causing the cable ends to be tightly gripped in position.

It will be apparent that in order to jettison the hood it is only necessary to apply a sharp pull to the handle 10, the pilot or passenger if necessary pressing the sides of the hood outwards to free the hood from the retaining pins 6. The cranked wires 7 can be adapted to slightly yieldingly oppose their retraction from their retaining pins 6 e. g. by the tightness of their fit or being slightly bent where they extend beyond the retaining pins.

I claim:

1. An airplane cockpit hood adapted to be jettisoned quickly in an emergency, comprising the combination of a hood frame provided with a plurality of apertures, retaining members extending through said apertures perpendicularly to the plane of the frame at the apertures, and adapted to receive the strain acting upon the hood during flight, said members being attached to the airplane at one end, having a hole at their other end, and supporting the hood frame between their ends, and locking means inserted in the holes of said retaining members preventing disengagement of the hood from said members and being releasable quickly from engagement therewith.

2. An airplane cockpit hood in accordance with claim 1 in which the locking means are releasable simultaneously from engagement with said retaining members by a common releasing means.

3. An airplane cockpit hood in accordance with claim 1 in which the releasing means comprise a cable and a lever, said cable having its one end attached to said lever and the other end attached to said locking means, whereby actuation of said lever releases said locking means quickly and simultaneously from engagement with said retaining members.

4. An airplane cockpit hood in accordance with claim 1 in which the locking means comprises crank-shaped members, each member having one limb inserted through a hole in said retaining members and having its other limb affixed to a bar-shaped releasing means extending along and parallel to the sides of said hood frame.

5. An airplane cockpit hood in accordance with claim 1 in which the retaining members are slidably attached to the airplane.

JAMES MARTIN.